United States Patent Office 3,677,876
Patented July 18, 1972

3,677,876
DECORATIVE LAMINATE SURFACED WITH A TRANSPARENT FILM OF POLYVINYL FLUORIDE WHICH FILM IS TEMPORARILY COVERED WITH A TRANSPARENT FILM OF NYLON
Jay Thomas Oliver, Fort Mitchell, Ky., assignor to Formica Corporation, Cincinnati, Ohio
No Drawing. Filed Feb. 18, 1970, Ser. No. 12,425
Int. Cl. B32b 7/06, 27/34
U.S. Cl. 161—165
6 Claims

ABSTRACT OF THE DISCLOSURE

A decorative laminate comprising a heat and pressure consolidated assembly of (1) a plurality of kraft paper core sheets,
(2) an alpha-cellulose paper decorative sheet,
(3) a film of a homogeneous blend of polyvinyl fluoride containing uniformly dispersed therein from about 0.1% to about 10% by weight of a ploymer of a polymerizable 2-hydroxy-benzophenone, and
(4) a removable film of nylon, wherein said kraft paper sheets had been pre-impregnated with a thermosetting phenolic resin and said alpha-cellulose sheet had been pre-impregnated with a thermosetting melamine-formaldehyde resin, all of said thermosetting resins having been converted to the thermoset state during the heat and pressure consolidation step.

CROSS REFERENCE TO RELATED APPLICATION

Reference is made to the U.S. patent application having the Ser. No. 780,183, filed on Nov. 29, 1968, in the names of Peter Bernard Kelly and Jay Thomas Oliver (attorney's Docket No. 22,576).

BACKGROUND OF THE INVENTION

Decorative laminates have been produced for a substantial plurality of years in preparing surface materials for the application to tables, vanitories, vertical wall coverings, door coverings, and the like. Ordinarily, these decorative laminates are prepared by assembling in superimposed relationship a plurality of kraft paper core sheets which have been impregnated with a thermosetting phenolformaldehyde resin. Superimposed above these core sheets, which may number between about 1 and 9 core sheets, there is positioned a decorative sheet that is impregnated with a thermosetting resin which does not undergo any noticeable deterioration in color, such as darkening, upon the subsequently applied laminating conditions. Typical resins that meet this description are the melamine-formaldehyde resins, the epoxy resins, the unsaturated polyester resins, the urea resins, and the like. The decorative sheet may be a solid color α-cellulose paper sheet which has been dyed or pigmented to a selected color such as white, pink, yellow, and the like, or the decorative sheet may be a print sheet in which some design such as a geometric design or a floral design or a wood print is imparted to the decorative side of the decorative sheet before or after impregnation with the color stable thermosetting resin. Frequently, there is superimposed above the decorative sheet an overlay sheet which is a sheet of fine quality paper such as α-cellulose paper sheet unpigmented but again impregnated with a color stable thermosetting resin, which overlay sheet is superimposed above the decorative sheet, and then the entire assembly is heat and pressure consolidated under conventional conditions of pressure and temperature to produce a unitary laminated product. The overlay is used primarily when the decorative sheet is a print sheet so as to provide a barrier to avert abrasion of the printed part of the print sheet and thus preserve its printed characteristics intact for prolonged periods of time. Another recent development in the decorative laminate field is the texturing of the laminate by use of a texturing release sheet. More recently, a structure such as that described hereinabove has had the overlay either replaced or additionally surfaced with certain selected thermoplastic films produced from vinyl polymers such as films of poly(methyl methacrylate), blends of poly-(methyl methacrylate) with polyvinylidene fluoride, polyvinyl fluoride, polyvinyl chloride and the like. Laminates of this composite type have many attractive features for use in building products and particularly in decorative surfacing products. The bridging of surface irregularities of substrates is an attractive feature of the thermosetting type of plastics while the continuous resin film properties of some thermoplastics give excellent moisture and weather resistance.

Attempts to combine the two types of plastics have frequently met with failure on the industrial scale mainly because of the difference in the thermal stability in the two types of materials. This problem relating to the thermal stability has been solved and is disclosed and claimed in the copending application, Ser. No. 872,356 filed on or about Oct. 29, 1969, attorney's Docket No. 23,227. An additional problem has arisen with respect to these thermoplastic film surfaced decorative laminates that resides on the scuffing of the thermoplastic film during the handling of the laminate after production and before final installation. Such treating steps as coating, handling, machining operations and installation frequently produced scratches on the surface of the film, which scratches were undesirable. By the process of the present invention there is securely but temporarily imposed on the modified polyvinyl fluoride film a removable nylon film which noticeably improves the scratch resistance of the modified polyvinyl fluoride surface; and further prevents volatile spots, which normally occur on large plant pressed sheets, and finally prevents minute cracks and fissures in the polyvinyl fluoride modified surfaced film during the pressing operation. These fissures could later be a source of weathering failure.

FIELD OF THE INVENTION

The concept of the present invention is in the field of laminated decorative plastic articles; and more particularly, decorative laminated plastic articles that are permanently surfaced with a transparent film of a thermoplastic material, which transparent film is protected with a securely bonded but removable film of a linear superpolyamide, such as nylon.

DESCRIPTION OF THE PRIOR ART

The instant applicant is not aware of any prior art that is of significance in anticipatory quality.

SUMMARY OF THE INVENTION

This invention relates to a decorative laminate comprising a heat and pressure consolidated assembly of (1) a plurality of kraft paper core sheets, (2) an alpha-cellulose paper decorative sheet, (3) a film of a homogeneous blend of polyvinyl fluoride containing uniformly dispersed therein from about 0.1% to about 10% by weight of a polymer of a polymerizable 2-hydroxy-benzophenone, and (4) a removable film of nylon, wherein said kraft paper sheets had been pre-impregnated with a thermosetting phenolic resin and said alpha-cellulose sheet had been pre-impregnated with a thermosetting melamine-formaldehyde resin, all of said thermosetting resins having been converted to the thermoset state during the heat and pressure consolidation step.

Decorative plastic laminates have been prepared from phenolic impregnated kraft paper core sheets and decorative sheets impregnated with a noble thermosetting resin, which assembly can be heat and pressure consolidated to a unitary structure. The use of an α-cellulose transparent sheet impregnated with the same type of noble resin has also been used for a plurality of years in commercial production. The use of the film of a homogeneous blend of polyvinyl fluoride containing uniformly dispersed therein small quantities of a polymer of a 2-hydroxy-benzophenone is disclosed and claimed in the copending application of the instant applicant and his co-inventor, Peter Bernard Kelly, referred to hereinabove.

The U.S. Pat. 3,340,137 discloses and claims a unitary, heat and pressure consolidated weather resistant decorative laminated article which is surfaced with a substantially transparent top film of adherable polyvinyl fluoride. The U.S. Pats. 2,937,157, 2,904,529, 2,947,723, 2,962,533, 3,173,893, 3,215,665, 3,313,866 and 3,365,421 show polymerizable ultraviolet absorbers and polymers thereof. All of these patents are incorporated herein by reference.

The thermoplastic transparent films used as the surface layer in the ultimate Kelly-Oliver laminate, is restricted to the same modified polyvinyl fluoride films of the present invention. The films of the polyvinyl fluoride are recognized for their ability to withstand severe adverse weathering conditions and would be ideally suited for the surface layer of a decorative laminate if it were not for the fact that polyvinyl fluoride, in film form, has a reputation for being a difficultly adherable material. This problem has been solved to a considerable extent and certain films of polyvinyl fluoride that have been pretreated on one side are rendered more adherable.

In the present invention a modified film of polyvinyl fluoride is used wherein said film contains uniformly dispersed therein from about 0.1% and 10% by weight of a polymer derived from a polymerizable 2 - hydroxybenzophenone. Such a blended material in film form will bond securely and permanently to the uppermost paper sheet in a decorative laminate assembly, if the uppermost paper sheet is (1) an α-cellulose paper sheet and if (2) said α-cellulose paper sheet is impregnated with a thermosetting melamine-formaldehyde resin having a resin content in said sheet within the range of 60% to about 70% by weight based on the total weight of the impregnated α-cellulose sheet. It is preferred to use between about 1% and 5% by weight of the polymer of the polymerizable 2-hydroxy-benzophenone. The concept of the present invention is applicable to laminates in which the surface film is bonded directly to the α-cellulose paper sheet which paper sheet is the decorative sheet either because it has been pigmented with a selected pigment so as to give it a solid color or in which the α-cellulose sheet is printed with some suitable selected design. It is preferred, however, that the surface film of the polyvinyl fluoride composition be bonded indirectly to the decorative sheet by use of an "overlay sheet" which overlay sheet is also an α-cellulose paper sheet which has been pre-impregnated with from about 60% to about 70% by weight of a thermosetting melamine-formaldehyde resin. When the "overlay" sheet is used and becomes transparentized during the heat and pressure consolidation step, the decorative sheet, which is positioned immediately below the overlay sheet, is simply impregnated with conventional amounts of the thermosetting melamine-formaldehyde resin, namely between about 40% and 50% by weight. When no overlay sheet is used and the modified polyvinyl fluoride film is bonded directly to the decorative sheet said decorative sheet must likewise be an α-cellulose paper sheet and must contain between about 60% and 70% by weight of the thermosetting melamine-formaldehyde resin. Beneath the decorative sheet, any of the conventional rigidity imparting base members may be used and preferably one would use one or more kraft paper core sheets impregnated with a thermosetting phenolic resin. The number of core sheets can be varied at will and depends upon the desired thickness of the ultimate laminate. During the heat and pressure consolidation step all of the thermosetting resins used to impregnate the various paper layers, namely the melamine-formaldehyde and the phenol-formaldehyde resins are converted to the thermoset state.

The polyvinyl fluoride film used in the laminate of the present invention may be either clear or pigmented. These polyvinyl fluoride films are available commercially and can be obtained in a plurality of thicknesses such as those varying between about 0.5 and 4 mils.

The melamine-formaldehyde resin used in the above stated amounts to impregnate that α-cellulose paper sheet which, in the ultimate laminate produced, is in direct physical contact with the modified polyvinyl fluoride film. Whether the paper sheet is the decorative sheet or the overlay sheet, it must be impregnated with a melamine-formaldehyde thermosetting resin having a mol ratio varying between about 1:1.5 and 1:2.5 and preferably 1:1.9 and 1:2.1 melamine to formaldehyde respectively.

The linear superpolyamide films used as the temporary surface of the decorative laminates of the present invention can be secured from a plurality of commercial sources and are generally polymers of E-caprolactams. These films are frequently referred to as nylon films and come in a plurality of thicknesses such as about 0.5 mil and 2 mils in thickness. The thickness of the nylon film is not critical and is determined only by commercial availability and economics. One particularly useful film is available commercially in a 1 mil thick film.

In order that the concept of the present invention may be more completely understood, the following examples are set forth.

EXAMPLE 1

Eight sheets of a thermosetting phenol-formaldehyde resin impregnated kraft paper are arranged in superimposed relationship. A decorative sheet of α-cellulose paper impregnated with a thermosetting melamine-formaldehyde resin in a content of about 40% by weight of the melamine-formaldehyde resin is superimposed on the core sheets and an overlay sheet of α-cellulose paper, 29 lbs. basis weight (3000 sq. ft. ream size), impregnated with 68% by weight of a thermosetting melamine-formaldehyde resin having a mol ratio of 1:2 respectively is superimposed on the decorative sheet. On the overlay sheet, there is positioned a commercially available one mil (.001") thick clear polyvinyl fluoride film which contains about 5% of a homopolymer of 2-hydroxy-4-acryloxyethoxy benzophenone UV stabilizer; said film having been pre-treated so as to make it adherable on both sides. There is then superimposed on the modified polyvinyl fluoride film a 1 mil thick film of nylon 6 (capran 77–C as supplied by the Allied Chemical Company). The entire assembly is then inserted into a press and heat and pressure consolidated to a unitary structure using 1400 p.s.i. pressure and heating at 160° C. for 20 minutes and then cooling and removing from the press. The resulting laminate withstood machining operations, such as sawing and routing and hot veneering conditions in which the temperature exceeded 200° F. for 4 minutes. Thereafter the nylon film was removed easily leaving a uniform and unspotted laminate surface.

EXAMPLE 2

Example 1 is repeated in all essential details except that in the place of the nylon film used therein there was used a heat-stabilized nylon film. This film is also derived from a polymer of E-caprolactam as supplied by the Allied Chemical Company, and identified as grade Capran 80. The results obtained from machining and hot veneering tests performed on laminates clad with this film where equivalent to those of the non-heat stabilized film of Example 1.

One of the unexpected results realized in including the nylon protective film in the laminate buildup is the fact that the volatile spots that normally occur on the surface of the plant-pressed sheets now apepar on the polyamide film; and when this film is removed, a uniform and unspotted surface is obtained. Normally these spots are removed from standard melamine resin surfaced laminates by buffing or polishing operation. However, the modified polyvinyl fluoride surface is generally very thin and cannot be post-finished by these methods; and as a result, a spotted sheet would have to be rejected for scrap if it were not for the protection that the nylon film provides. A further unexpected bonus resides in the fact that after the nylon film is removed, the modified polyvinyl fluoride surface is noticeably less susceptible to scratching than the same laminate pressed without the nylon covering. Finally, it has been observed by microscopic examination that the modified polyvinyl fluoride surface of the laminates pressed without the nylon film (for instance, pressed directly against a silicone-treated release foil) had very small cracks and fissures whereas laminates pressed with the nylon against the modified polyvinyl fluoride surface had no cracks and no fissures. This is certainly an advantage in that the polyvinyl fluoride modified film without cracks in the surface will offer a laminate with considerably improved weatherability. In conclusion, in addition to all of the advantages set forth hereinabove, the laminates prepared according to the present invention with the nylon protective covering affords excellent durability and weatherability. The nylon film can be permitted to remain on the laminate during shipping so that as received and installed, the nylon film is still bonded removably to the decorative laminate. This permits the inspection of the decorative surface as well as providing a printable surface for brand identification, instructions and advertising on the transparent nylon film which can be then readily removed thereby removing brand identification, instructions and advertising.

I claim:

1. A decorative laminate comprising a heat and pressure consolidated assembly in superimposed relationship of
   (1) a plurality of kraft paper core sheets,
   (2) an alpha-cellulose paper decorative sheet,
   (3) a transparent film of a homogeneous blend of polyvinyl fluoride containing uniformly dispersed therein from about 0.1% to about 10% by weight of a polymer of ap olymerizable 2-hydroxy benzophenone, and
   (4) a removable transparent film of nylon, wherein said kraft paper sheets had been pre-impregnated with a thermosetting phenolic resin and said alpha-cellulose sheet had been pre-impregnated with a thermosetting melamine-formaldehyde resin, all of said thermosetting resins having been converted to the thermoset state during the heat and pressure consolidation step and wherein the melamine-formaldehyde resin is present in the alpha-cellulose sheet in an amount of from about 60% to about 70% by weight and said resin has a mol ratio between about 1:1.5 and 1:2.5 melamine to formaldehyde respectively.

2. A decorative laminate according to claim 1 in which there is positioned an alpha-cellulose paper sheet that had been pre-impregnated with a thermosetting melamine-formaldehyde resin between the decorative sheet and the film of the homogeneous blend of polyvinyl fluoride and wherein the thermosetting resin is converted to the thermoset state during the heat and pressure consolidation step.

3. A decorative laminate according to claim 1 in which the polyvinyl fluoride film layer is a pigmented transparent film.

4. A decorative laminate according to claim 1 in which said benzophenone polymer is present in the homogeneous polyvinyl fluoride film in an amount varying between about 1% and 5% by weight based on the total weight of said film.

5. A laminate according to claim 1 in which the nylon film is between about 0.5 mil and 2 mils in thickness.

6. A laminate according to claim 1 in which the nylon film is about 1 mil in thickness.

References Cited

UNITED STATES PATENTS

| | | | |
|---|---|---|---|
| 3,403,071 | 9/1968 | Perry et al. | 161—189 |
| 3,475,248 | 10/1969 | Brasure | 161—189 |
| 3,470,134 | 9/1969 | Ungar | 161—263 |
| 2,630,395 | 3/1953 | McCullough et al. | 156—323 |
| 2,660,548 | 11/1953 | Soehner | 156—219 |
| 3,539,389 | 11/1970 | Tu | 161—406 |
| 3,365,421 | 1/1968 | Horton et al. | 260—47 |
| 3,378,433 | 4/1968 | Palazzolo et al. | 161—156 |
| 3,421,973 | 1/1969 | Kamal | 161—189 |
| 3,215,665 | 11/1965 | Sharetts et al. | 260—45.95 |
| 3,547,753 | 12/1970 | Sutton | 161—406 |

ROBERT F. BURNETT, Primary Examiner

G. W. MOXON, II, Assistant Examiner

U.S. Cl. X.R.

156—323; 161—189, 227, 258, 406, 413